March 6, 1928. 1,661,753
S. B. HASELTINE
FRICTION SHOCK ABSORBING MECHANISM
Filed Aug. 30, 1926 2 Sheets-Sheet 2
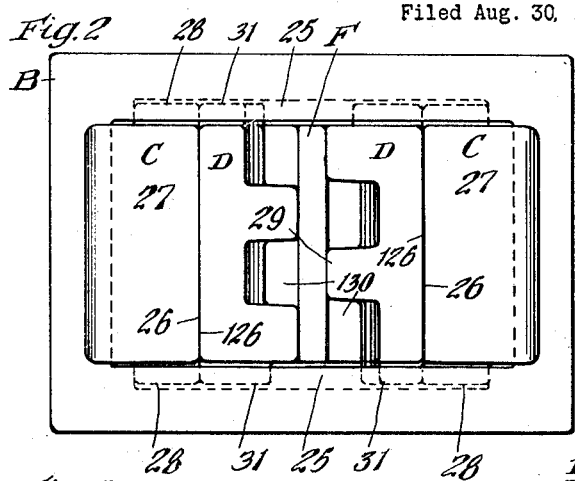
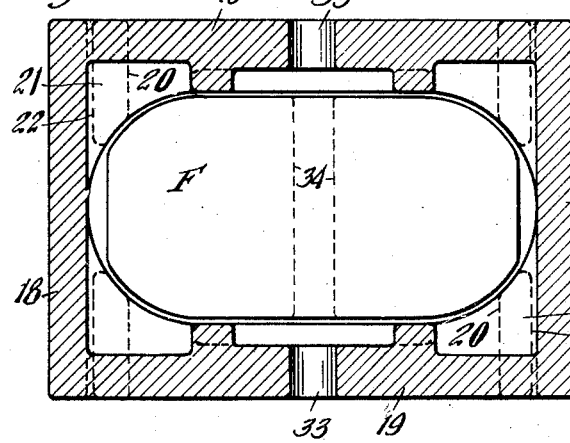
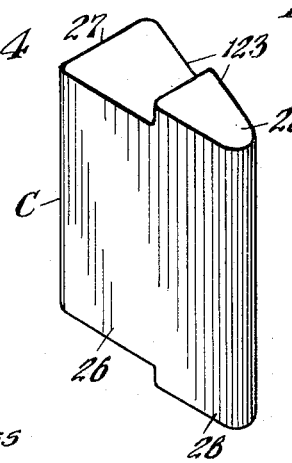
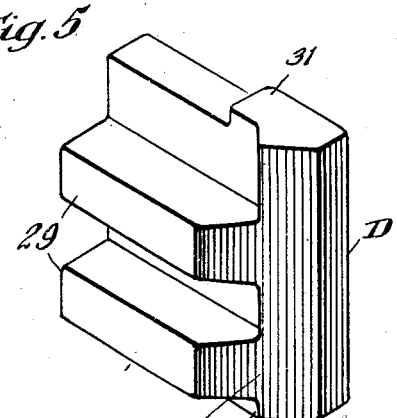
Witness
Wm. Geiger
Inventor
Stacy B. Haseltine
By George I. Haight
His Atty.

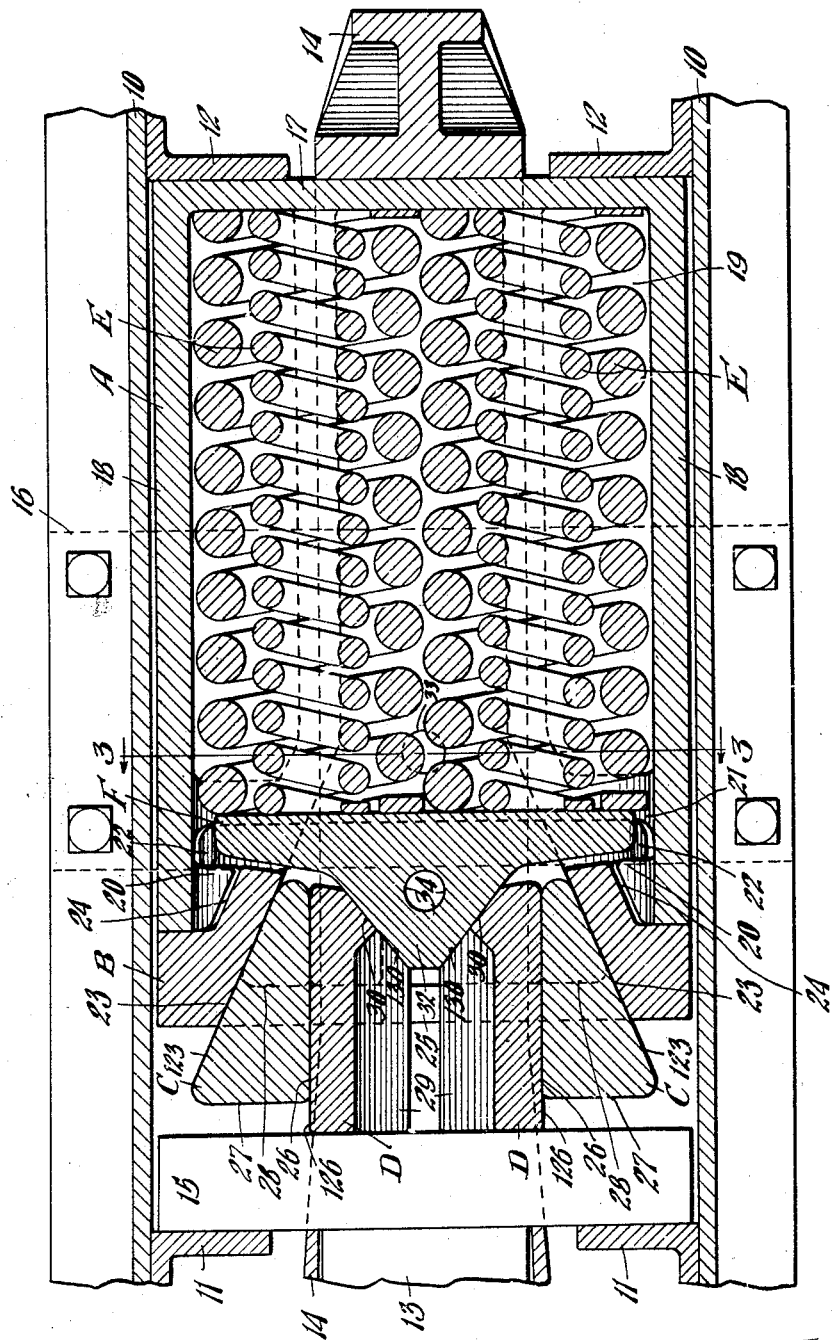

Patented Mar. 6, 1928.

1,661,753

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 30, 1926. Serial No. 132,397.

This invention relates to improvements in friction shock absorbing mechanisms.

One object of the invention is to provide a friction shock absorbing mechanism having spring action accompanied by a minimum amount of frictional resistance during a portion of its action and heavy frictional capacity during the remainder of the stroke to absorb exceedingly heavy shocks.

Another object of the invention is to provide a friction shock absorbing mechanism of the character indicated especially adapted for railway draft riggings, including a main spring resistance, pressure transmitting elements for effecting compression of the main spring resistance to a limited extent during a portion of the compression stroke, and friction wedge elements rendered effective after the springs have been compressed to a predetermined extent to absorb heavier shocks to which the mechanism is subjected.

Other objects and advantages of the invention will more fully and clearly appear from the description and claims hereinafter following.

In the drawings, forming a part of this specification, Figure 1 is a horizontal, longitudinal sectional view of a portion of a railway draft rigging, showing one embodiment of my improvements in connection therewith. Figure 2 is a front end elevational view of the shock absorbing mechanism properly illustrated in Figure 1. Figure 3 is a transverse vertical sectional view corresponding substantially to the line 3—3 of Figure 1. Figures 4 and 5 are detailed perspective views of a wedge block and a pressure transmitting element employed in connection with the preferred embodiment of the invention illustrated in Figures 1 to 3, inclusive. And Figure 6 is a view similar to Figure 1 of the front end portion of the shock absorbing mechanism proper illustrating a different embodiment of the invention.

In said drawings, referring especially to Figure 1, 10—10 indicate channel-shaped center or draft sills of a railway car underframe, to the inner sides of which are secured front stop lugs 11—11 and rear stop lugs 12—12. The inner end portion of the drawbar is designated by 13, to which is connected a yoke 14 of well-known form. The shock absorbing mechanism proper hereinafter more fully described, and a main follower 15, are disposed within the yoke. The yoke and the parts therewithin are supported in operative position by a detachable saddle plate 16 fixed to the draft sills.

Referring first to the embodiment of the invention illustrated in Figures 1 to 5, inclusive, my improved shock absorbing mechanism as shown, comprises broadly: A spring cage A; a wedge friction shell B; a pair of wedge blocks C—C; a pair of pressure transmitting elements D—D; twin arranged main spring resistance elements E—E; and a spring follower F.

The spring cage A is in the form of a substantially rectangular box-like casting having a transverse vertically disposed rear end wall 17, longitudinally disposed spaced vertical side walls 18—18; and horizontally disposed spaced top and bottom walls 19—19. The end wall 17 of the spring cage co-operates with the rear stop lugs 12 in the manner of the usual rear follower. As the forward end of the spring cage, the top and bottom walls are provided with aligned openings presenting front and rear stop shoulders 20 and 21. The spaces between the stop shoulders 20 and 21 at opposite sides of the spring cage define vertical guideways adapted to accommodate lugs 22—22 on the inner end of the wedge friction shell to retain the latter in assembled relation with the spring cage A.

The wedge friction shell B is in the form of a relatively heavy casting having opposed interior inwardly converging friction wedge faces 23 on the opposite sides thereof. At the inner end, the shell is cut away on opposite sides as indicated at 24—24, thereby leaving the lugs 22 which as hereinbefore pointed out serve to connect the wedge friction shell to the spring cage. At the extreme forward end of the wedge friction shell, the top and bottom walls are provided with transversely extending interior aligned ribs 25—25 for a purpose hereinafter described.

In assembling the wedge friction shell B with the spring cage, the lugs 22 of the former are inserted through the opening of the top of the spring cage between the shoulders 20 and 21 of the latter. It will be evident that when the wedge friction shell has been thus assmbled with the friction cage and has been brought into exact alignment therewith, the wedge friction shell will be held against longitudinal movement with respect to the cage.

The wedge blocks C which are two in number, are disposed at opposite sides of the mechanism. The blocks C are of similar design, each being provided with a longitudinally disposed flat friction surface 26 on the inner side thereof adapted to co-operate with the corresponding pressure transmitting element D. On the outer side, each wedge block C is provided with a flat wedge friction face 123 similarly inclined to and adapted to co-operate with the corresponding wedge face 23 of the shell B. The outer end of each wedge block is provided with a flat transverse face 27 adapted to co-operate with the inner surface of the main follower 15 during a portion of the compression stroke of the mechanism. As shown in Figure 1, the blocks C are normally spaced a certain distance from the inner side of the front follower 15. The wedge blocks C are maintained in this position by top and bottom lugs 28 thereon adapted to engage behind the top and bottom ribs 25 on the wedge friction shell B.

The pressure transmitting elements which are two in number, are disposed between the wedge blocks C. The two pressure transmitting elements D are of similar design, each having a longitudinally disposed flat outer friction surface 126 adapted to co-operate with the friction surface 26 of the corresponding wedge block C. Each element D is also provided with a flat front end face adapted to bear on the inner side of the main follower 15. The two wedge pressure transmitting elements are exact duplicates of each other, but are reversely arranged, each element being provided with a pair of spaced longitudinally disposed ribs 29—29 on the inner sides thereof designed to increase the width of bearing of the pressure transmitting elements on the follower 15 and the spring follower F. The ribs 29 of one element D are adapted to be alternated with the ribs 29 of the other element when the two elements are in their assembled position, thereby permitting the necessary relative approach of the same during compression of the mechanism. At the inner end, each element is provided with an inner wedge face 30 adapted to co-operate with the spring follower F. The elements D are cut away at the top and bottom sides as most clearly shown in Figure 5, thereby presenting top and bottom enlargements 31 at their rear ends, which engage behind the transverse ribs 25 on the top and bottom walls of the wedge friction shell B to limit the outward movement of the pressure transmitting elements.

The spring resistance elements E—E as most clearly shown in Figure 1, are in twin arrangement, each member comprising a relatively heavy outer coil and a lighter inner coil having their opposite ends bearing respectively on the transverse end wall 17 of the spring cage A and the inner side of the spring follower F. The spring follower F is thus yieldingly urged outwardly of the spring cage A.

The spring follower F is in the form of a relatively heavy rectangular plate having a central enlargement 32 on the front side thereof provided with forwardly converging wedge faces 130—130 on the opposite sides thereof adapted to co-operate with the wedge faces 30 at the rear ends of the pressure transmitting elements D.

In assembling the mechanism, the spring resistance elements and the spring follower F are first placed within the spring cage. The parts are then compressed and are temporarily secured in position while the wedge friction shell is assembled in the spring cage. As most clearly shown in Figure 1, the top and bottom walls of the spring cage are provided with aligned openings 33 and the spring follower is provided with a vertical bore 34, the openings 33 and the bore 34 being brought into alignment when the parts are temporarily compressed as hereinbefore pointed out, so as to receive a pin or a key to hold the parts in the compressed position during the time that the wedge friction shell is assembled with the friction cage. When the parts are so held, the wedge friction shell is assembled with the spring cage by passing the lugs 22 of the former between the shoulders 20 and 21 of the spring cage. Before assembling the wedge friction shell with the spring cage, the wedge blocks C and the pressure transmitting elements D are placed within the shell. After the wedge friction shell has been attached to the spring cage, the retaining pin is removed and the spring resistance elements are allowed to expand, thereby forcing the spring follower forwardly into engagement with the wedge pressure transmitting elements. With the spring follower in this position, the body portion thereof is disposed between the top and bottom lugs 22 on the wedge friction shell, the shell being cut away between these lugs to accommodate the spring follower. It will be evident that the spring follower thus prevents vertical displacement of the wedge friction shell with reference to the spring cage.

The normal full release position of the parts is that illustrated in Figure 1, wherein the wedge blocks are in spaced relation to the main follower 15, and the pressure transmitting elements are in engagement with the follower.

The operation of the improved shock absorbing mechanism as illustrated in Figures 1 to 5, inclusive, assuming a compression stroke of the mechanism, is as follows: As the front follower and spring cage are moved relatively to each other, the pressure transmitting elements D will be moved inwardly with reference to the wedge friction shell and spring cage, sliding on the friction surfaces of the wedge block C. As the pressure transmitting elements move inwardly, the spring follower F will be forced rearwardly, thereby compressing the main springs E. During this action there will be but very little friction between the pressure transmitting elements and wedge blocks and the latter will be maintained in their outermost position due to the frictional resistance between the wedge faces 23 and 123 of the wedge friction shell and blocks respectively. The described action will continue until the pressure transmitting elements have been moved inwardly to such an extent that the outer ends of the wedge blocks C will be engaged by the main follower 15, whereupon the wedge blocks C will be moved inwardly in unison with the pressure transmitting elements D. The pressure transmitting element and wedge block C at each side of the mechanism will thus function as a single member during the remainder of the compression stroke of the mechanism. On account of the converging relation of the wedge faces 23 of the wedge friction shell, the wedge blocks C and the pressure transmitting elements D will be displaced laterally inwardly as a unit, sliding on the flat end face of the main follower 15. Due to the lateral approach of the pressure transmitting elements D, the spring follower F will be squeezed out between the same, thereby effecting an inward movement of the spring follower at a more rapid rate than the inward movement of the main follower 15. An additional compression of the spring resistance elements E will thus be effected. It will be evident that during the initial compression of the mechanism while only the pressure transmitting elements D move, compression of the springs E only will be effected and that when the wedge blocks are picked up a frictional resistance will be added together with a differential action, thus greatly augmenting the resistance during the remainder of the compression stroke.

The compression of the mechanism will continue either until the actuating force is reduced or until the main follower 15 comes into engagement with the outer end of the wedge friction shell, whereupon the actuating force will be transmitted directly through the shell and spring cage A to the draft sills, these elements acting as a column load transmitting member, thus preventing the main springs from being unduly compressed.

When the actuating force is reduced, the expansive action of the springs E will force the follower F outwardly and carry the pressure transmitting elements therewith. Due to the friction existing between the pressure transmitting elements and the wedge blocks C, there will also be a tendency to carry the latter outwardly with the pressure transmitting elements. Outward movement of the pressure transmitting elements is finally limited by engagement of the lugs 28 thereof with the transverse ribs 22 of the wedge friction shell. On account of the wedging action between the spring follower and the pressure transmitting elements, the latter will be forced laterally apart, forcing the wedge blocks C laterally outwardly against the wedge faces 23 of the wedge friction shell. Due to the squeezing action, the blocks C will be forced longitudinally outwardly until limited by engagement of the lugs 31 thereof with the ribs 25 of the shell. The parts will thus all be restored to the normal position illustrated in Figure 1.

Referring next to the embodiment of the invention illustrated in Figure 6, the same comprises broadly: A spring cage A' of identical construction with the spring cage A hereinbefore referred to; a wedge friction shell B' which is also identical with the wedge friction shell B hereinbefore described; a pair of wedge blocks C'; a pair of pressure transmitting elements D'; a spring follower F'; and a pair of twin resistance elements not shown.

The wedge friction shell B' is attached to the spring cage A' in exactly the same manner as the wedge friction shell B is attached to the spring cage A, the wedge friction shell B' being provided with lugs 50 cooperating with shoulders 51 and 52 on the cage A'. For the sake of clearness, the spring resistance elements have been omitted in connection with the showing in Figure 6, but these are identical with and arranged in the same manner as the spring resistance elements E hereinbefore described in connection with Figures 1 to 5, inclusive.

The wedge friction shell B' is provided with opposed interior rearwardly converging wedge friction faces 53—53 adapted to co-operate with wedge friction surfaces 153—153 on the outer sides of the wedge block C'. The wedge blocks C' have transverse front end faces 54 adapted to bear on the inner side of the front follower of the mechanism. On the inner sides, the blocks C' are longitudinally cut away, thereby presenting transverse enlargements 55 at the rear ends. At the inner ends, the enlargements 55 present laterally inclined faces 56 adapted to co-operate with similar faces 156 on the spring follower F'. At the forward end, the enlargements 55 present transverse abutment shoulders 57 adapted to co-operate with similar shoulders 58 on the pressure transmitting elements D'. The pressure transmitting elements D' and wedge blocks C' have longitudinally disposed co-operating side surfaces indicated respectively by 59 and 60. At the inner end, each pressure transmitting element D' has an inner wedge face 61 adapted to co-operate with a similar wedge face 62 on an enlargement 63 at the front side of the spring follower F. As clearly shown in Figure 6, the enlargement 63 of the spring follower has the wedge faces 62 on opposite sides thereof and these faces converge outwardly of the mechanism. Both the friction wedge blocks and the pressure transmitting elements are provided with top and bottom lugs co-operating with transverse ribs 64—64 on the top and bottom walls of the wedge friction shell in a manner similar to the corresponding lugs on the blocks C and pressure transmitting elements D described in connection with Figures 1 to 5, inclusive. The lugs on the blocks C' and pressure transmitting elements D' are so disposed that the blocks C' will project outwardly beyond the outer end of the pressure transmitting elements D'.

The mode of assembling the mechanism illustrated in Figure 6 is similar to that described in connection with the first embodiment of the invention.

The operation of the device illustrated in Figure 6 is as follows, assuming a compression stroke: The wedge blocks C' will be moved inwardly by the pressure of the front follower, thereby forcing the spring follower F' inwardly also. As the spring follower is moved inwardly, the wedge blocks C' will be forced laterally toward each other on account of the converging relation of the wedge faces 53 of the wedge friction shell B'. During the lateral approach of the wedge blocks C', the pressure transmitting elements D' will also be moved laterally toward each other, inasmuch as they are held against outward movement with reference to the wedge friction shell. During this initial movement, the spring follower will be squeezed out between the wedge blocks C' and carried inwardly of the mechanism at such a rate that the wedge faces 62 thereof will leave their engagement with the faces 61 of the elements D'. This action will continue until the outer ends of the pressure transmitting elements D' are engaged by the main follower, whereupon the pressure transmitting elements and wedge blocks C' will be moved inwardly as a unit. During this action, the wedge blocks C' and the pressure transmitting elements D' at each side of the mechanism will move bodily laterally also on the main follower. As the members on the opposite sides of the mechanism are moved bodily toward each other, there will be a more rapid squeezing out of the spring follower F', thereby effecting a movement of the same at a greater rate than the movement of the main follower and also at an increased rate over the movement thereof during the preliminary action described. It will thus be evident that my improved mechanism as illustrated in Figure 6 has two stages of action, a relatively light initial action and a heavier final action, there being very little friction during the initial action, the resistance being offered mainly by the spring elements.

During the release of the gear, the outward movement of the spring follower F' will force the pressure transmitting elements and wedge blocks to their normal position, the inclined co-operating faces 56 and 156 on the wedge blocks and spring follower, assuring the proper normal positioning of the wedge blocks.

While I have herein shown and described what I now consider the preferred manner of carrying out my invention, the same is merely illustrative, and I contemplate all changes and modifications that come within the scope of the claims appended hereto.

1. In a friction shock absorbing mechanism, the combination with a spring cage having a shell at the forward end thereof provided with opposed interior wedge faces; of wedge shoes co-operating with the shell wedge faces; a spring resistance; pressure transmitting elements between the wedge shoes and co-operating with the spring resistance, said elements normally extending beyond the outer ends of the shoes to initially receive the actuating pressure, said elements being moved relatively to the shoes longitudinally thereof until the shoes are engaged and moved inwardly of the shell; and means for forcing said pressure transmitting elements apart and maintaining the same in engagement with the wedge shoes.

2. In a friction shock absorbing mechanism, the combination with a spring cage having a shell at the outer end thereof provided with opposed interior wedge faces; of wedge blocks co-operating with the wedge faces of the shell; pressure transmitting elements interposed between the wedge blocks; means for limiting the outward movement of said elements, the front ends of said blocks being staggered with respect to the pressure transmitting elements; whereby the actuating force is delivered to said blocks and elements at different stages in operation of the mechanism; spring means opposing inward movement of said pressure transmitting elements and blocks; and means for maintaining the pressure transmitting elements in contact with the wedge blocks.

3. In a friction shock absorbing mechanism, the combination with a column element provided with opposed wedge faces; wedge blocks co-operating with said wedge faces; a spring resistance; pressure transmitting elements co-operating with the wedge blocks and longitudinally movable with reference thereto, and co-operating with the spring resistance, said elements normally extending beyond the outer ends of the wedge blocks to initially receive the actuating pressure, said elements being movable relatively to the blocks longitudinally thereof until the blocks are engaged and move inwardly of the shell; and means for forcing said pressure transmitting elements against said blocks.

4. In a friction shock absorbing mechanism, the combination with a spring cage having a shell at the forward end thereof provided with opposed interior wedge faces; wedge blocks co-operating with the wedge faces of the shell; a spring resistance; pressure transmitting elements between the wedge blocks; a spring follower interposed between the inner ends of said elements and the spring resistance, said follower having wedging engagement with said elements to force the same laterally apart, said elements normally extending beyond the outer ends of the wedge blocks to initially receive the actuating pressure, said elements being moved relatively to the blocks longitudinally thereof until the blocks are engaged and moved inwardly of the shell.

5. In a friction shock absorbing mechanism, the combination with a spring cage having a shell at the forward end thereof provided with opposed interior wedge faces; wedge shoes co-operating with the shell wedge faces; means on said shoes co-operating with the shell to limit outward movement of the shoes; a spring resistance; pressure transmitting elements between said shoes and co-operating with the spring resistance, said elements having shouldered engagement with the shell to limit outward movement of said elements, said elements normally extending beyond the outer ends of the shoes to initially receive the actuating pressure, said elements being movable relatively to the shoes longitudinally thereof until the shoes are engaged and moved inwardly of the shell; and means for forcing said pressure transmitting elements apart and maintaining the same in engagement with the wedge blocks.

6. In a friction shock absorbing mechanism, the combination with a spring cage having a shell at the outer end thereof provided with opposed interior wedge faces; of a main follower, said follower and shell being movable relatively toward and away from each other; wedge blocks co-operating with the wedge faces of the shell; pressure transmitting elements interposed between the wedge blocks; means for limiting outward movement of the wedge blocks and pressure transmitting elements, the front ends of said blocks being staggered with respect to the pressure transmitting elements, whereby the actuating force from the main follower is delivered to said blocks and elements at different stages in the operation of the mechanism; spring means opposing inward movement of said pressure transmitting elements and blocks; and means for maintaining the pressure transmitting elements in contact with the wedge blocks.

7. In a friction shock absorbing mechanism, the combination with a spring cage having a friction shell at the forward end thereof provided with opposed interior wedge faces; wedge blocks co-operating with the shell wedge faces, said blocks having lugs thereon co-operating with the shell to limit outward movement of the blocks with reference to the shell; a spring resistance; pressure transmitting elements between the wedge blocks and co-operating with the spring resistance, said elements normally extending beyond the outer ends of the blocks to initially receive the actuating force, said elements being moved relatively to the blocks longitudinally thereof until the blocks are engaged and moved inwardly of the shell; and means for forcing said pressure transmitting elements apart and maintaining the same in engagement with the wedge blocks.

8. In a friction shock absorbing mechanism, the combination with a main follower; of a spring cage having a friction shell detachably connected to the outer end thereof, the shell being provided with interior inwardly converging wedge faces, said cage and follower being relatively movable toward and from each other; wedge blocks co-operating with the wedge faces of the shell, said blocks having longitudinally disposed inner friction surfaces; pressure transmitting elements slidable longitudinally on the surfaces of the wedge blocks, said pressure transmitting elements extending beyond the outer ends of the blocks and into engagement with the main follower; spring resistance elements disposed within the spring cage; and a spring follower interposed between the inner ends of the pressure transmitting elements and the spring resistance, said spring follower and pressure transmitting elements having co-operating wedge faces diverging inwardly of the mechanism.

9. In a friction shock absorbing mechanism, the combination with a friction shell having inwardly converging friction faces; of a spring resistance within the shell; a spring follower having outwardly converging faces lying normally between the friction faces of the shell; and a plurality of wedge members interposed between the converging faces of the shell and spring follower said wedges being arranged in pairs, one member of each pair extending outwardly beyond the other member to provide for limited relative movement of the same and light initial action.

In witness that I claim the foregoing I have hereunto subscribed my name this 26th day of August, 1926.

STACY B. HASELTINE.